United States

Meyerhofer

[11] 3,905,682
[45] Sept. 16, 1975

[54] LIQUID CRYSTAL DEVICES OF IMPROVED CONTRAST

[75] Inventor: Dietrich Meyerhofer, Princeton, N.J.

[73] Assignee: RCA Corporation, New York, N.Y.

[22] Filed: June 14, 1974

[21] Appl. No.: 479,529

[52] U.S. Cl. ............................................ 350/160 LC
[51] Int. Cl.² ............................................ G02F 1/13
[58] Field of Search ..... 350/150, 160 LC, 102, 105, 350/288

[56] References Cited
UNITED STATES PATENTS
3,728,007  4/1973  Myrenne et al. ............ 350/160 LC

*Primary Examiner*—Edward S. Bauer
*Attorney, Agent, or Firm*—H. Christoffersen; M. Y. Epstein

[57] ABSTRACT

Disposed behind a liquid crystal cell comprising transparent substrates and electrodes is a retro-reflecting surface for reflecting light incident onto the cell in directions substantially towards the sources of the light and generally away from a viewer of the cell.

3 Claims, 3 Drawing Figures

LIQUID CRYSTAL DEVICES OF IMPROVED CONTRAST

This invention relates to liquid crystal display devices, and particularly to means for increasing the apparent brightness or contrast of the display image.

As known, the liquid crystal material of liquid crystal devices does not emit light, and such devices must be illuminated. If the device is illuminated from its "rear" side, i.e., the side opposite to the viewed or observed side, the device is made essentially transparent to allow the light from the light source to reach the observer. If the device is illuminated from its front side, a light reflector is generally disposed behind the liquid crystal material to reflect light to the observer to increase the brightness of the display.

A problem very early recognized (see, for example, U.S. Pat. No. 3,499,112 issued to Heilmeier on Sept. 7, 1971, and assigned to RCA Corporation) but not completely solved to this day, is that the use of a light reflector behind the liquid crystal material not only increases the brightness of the display, as desired, but gives rise to undesired reflections of surrounding objects and light sources which tend to "clutter" the displayed image and also to reduce the contrast thereof.

Various schemes have been developed to solve this problem; e.g., reducing the reflectivity of the mirror-like reflectors, or using non-specular reflectors, e.g., diffuse reflectors. However, to the extent that these schemes are effective to reduce the undesired reflections, they also reduce the brightness of the display, and are thus generally less than satisfactory solutions to the problem.

In accordance with this invention, a "retro-reflective" surface is disposed behind the liquid crystal material.

By retro-reflective is meant a reflector which reflects light substantially directly back to the origin of the light, or along paths generally parallel to the incoming light, substantially regardless of the angle of incidence of the incoming light on the reflector.

Figure 1:
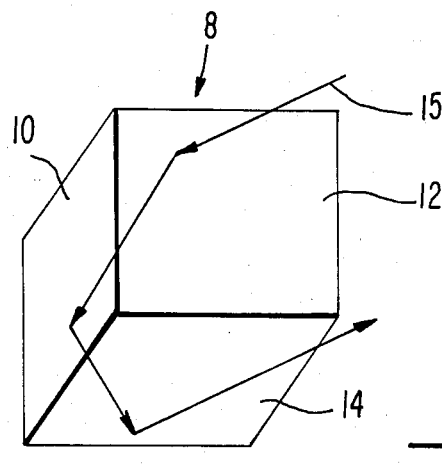
FIGS. 1 and 2 show different types of retro-reflectors of a type useful in accordance with the present invention.

Such retro-reflectors are well known. In one form, for example, shown in FIG. 1, a retro-reflector 8 comprises a "corner" three flat specular reflectors 10, 12 and 14 edge-joined at right angles to one another. Light, e.g., the light ray 15 shown in FIG. 1, entering the reflector 8 is reflected from one or more of the specular reflectors and then outwardly of the reflector along a path that is substantially parallel to the incoming light.

For use with the instant invention, as described below, a retro-reflective surface of the corner type preferably comprises a generally flat sheet of metal, e.g., aluminum foil, having a large number of tiny and closely spaced corners formed therein by a suitable coining process.

Figure 2:
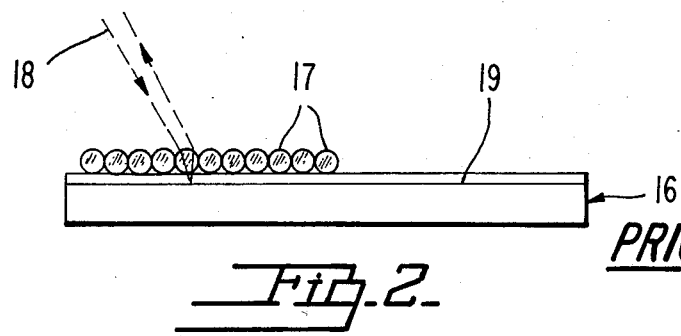

In another form, as shown in FIG. 2, a retro-reflector 16 comprises a large number of tiny transparent spheres 17, for example, of only a few mils diameter, which act as spherical lenses which accept light, e.g., the light ray 18, from any angle and focus it onto a plane reflecting surface 19 which returns a tight, but slightly diverging beam, towards the light source. This is a preferred form of the retro-reflector for use with liquid crystal cells for the reason that such retro-reflectors are presently commerically available, for example, from the Reflective Control Products Division of 3M Company, St. Paul, Minnesota.

Figure 3:
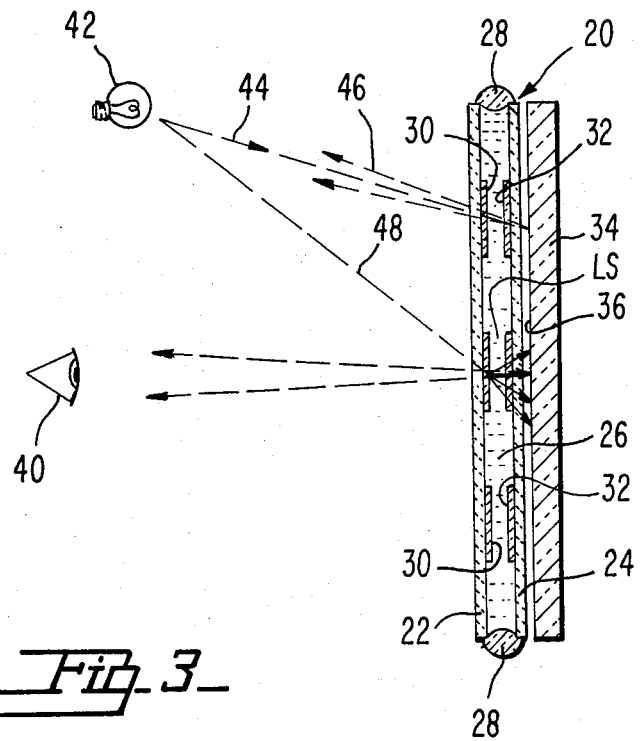
FIG. 3 shows, in cross section, a known type of liquid crystal cell in combination with a retro-reflective surface.

As shown in FIG. 3, a typical liquid crystal cell 20 comprises a pair of transparent substates 22 and 24 sandwiching a liquid crystal material film 26 therebetween. The substrates 22 and 24 are sealed together, and the spacing therebetween maintained, by a seal 28 of e.g., a glass frit. various transparent electrodes 30 and 32 are disposed on the inside surface of each substrate 22 and 24, respectively, whereby selected portions of the film 26 between various pairs of oppositely disposed electrodes 30 and 32 can be activated. For example, if the liquid crystal material is of the "dynamic scattering" type (see for example, the aforecited patent to Heilmeier), the liquid crystal material of the film 26 is normally transparent to light but becomes forward scattering of light when current is caused to flow therethrough.

The invention is not limited to any particular form of liquid crystal cell or to any particular liquid crystal materials.

A plate 34 having a retro-reflective surface on one side 36 thereof is disposed behind the cell 20, e.g., cemented, with a transparent cement, to the rear surface of the substrate 24 (for greater clarity of illustration, the plate 34 is shown from the substrate 24).

An observer 40 views the cell 20 from the "front" or substrate 22 side thereof, the device being illuminated from its front side by a light source 42. With a voltage applied between one pair of oppositely disposed electrodes 30 and 32, a portion LS of the film 26 is rendered light scattering, other portions of the film 26 remaining transparent.

Light reaching the cell 20 from the light source 42 and striking a transparent portion of the film 26, as illustrated by a light ray 44, passes through the film 26 (ignoring the various small refractions of the light by various surfaces of the cell 20), strikes against the retro-reflective surface 36 of the plate 34 and is reflected, in a relatively tight beam 46, in a direction towards the light source 42. Of importance is that the reflected light is not directed towards the observer 40 who thus does not see a reflected image of the light source 42.

Light reaching the light scattering portion LS of the film 26, however, e.g., the light ray 48, is forward scattered in many directions, and upon striking the retro-reflective surface 36, at least part of the light is reflected in directions towards the observer. Thus, the light scattering portion LS of the film 26 is made visible, appearing somewhat luminous to the observer, while the non-scattering, transparent portions of the film 26 remain unilluminated. The appearance of the background retro-reflecting surface 36 (visible, by the observer 40, through the non-scattering, transparent portions of the film 26) depends upon the color of the surface 36.

By so utilizing the light from the light source 42 for illuminating only selected portions of the film 26, while reflecting the light striking the non-selected film portions in directions away from the observer, displays having less background clutter and higher contrast are obtained.

While, in the device shown in FIG. 3, the retro-reflecting surface 36 is shown on a plate 34 mounted behind the cell 20, the retro-reflecting surface can be disposed within the cell itself. For example, using a retro-reflector of the corner type comprising a coined sheet of aluminum foil, the foil can be disposed within the cell on the inside surface of the substrate 24, the coined aluminum foil, in one embodiment, serving both as the retro-reflector and as an electrode of the device.

What is claimed is:

1. In combination, a liquid crystal device including:
    a body of liquid crystal material, said device being designed to be viewed along directions intersecting a front surface of said body, and
    a retro-reflecting member disposed, with respect to said viewing directions, behind said body and intersected by said directions.

2. The combination of claim 1 in which said retro-reflecting member comprises a layer of transparent spheres mounted on a specular surface.

3. The combination of claim 1 in which said device comprises:
    a pair of oppositely disposed front and rear transparent substrates, said body of liquid crystal material being disposed between said substrates; and
    said retro-reflecting member is disposed behind said rear substrate.

* * * * *